United States Patent [19]

Amory et al.

[11] Patent Number: 5,221,580
[45] Date of Patent: Jun. 22, 1993

[54] GRANULES OF COATED VINYL ACETATE/ETHYLENE COPOLYMER, PROCESS FOR PRODUCING THEM AND THEIR USE AS ADHESIVES

[75] Inventors: David Amory, Brussels; Claude Dehennau, Waterloo, both of Belgium

[73] Assignee: Solvay (Société Anonyme), Brussels, Belgium

[21] Appl. No.: 814,455

[22] Filed: Dec. 30, 1991

[30] Foreign Application Priority Data

Jan. 8, 1991 [BE] Belgium ............................ 9100013

[51] Int. Cl.⁵ .......................... B32B 5/16; B32B 9/00
[52] U.S. Cl. ............................ 428/403; 428/35.1; 428/500; 428/516; 428/349; 427/207.1; 427/208.2; 427/222; 525/48; 525/243
[58] Field of Search ............... 525/243, 48, 240; 428/85, 500, 516, 349, 403; 427/207.1, 208.2, 208.4, 222

[56] References Cited

U.S. PATENT DOCUMENTS

| | | |
|---|---|---|
| 3,494,784 | 2/1970 | De Coene et al. |
| 3,779,785 | 12/1973 | Stiles et al. |
| 3,911,193 | 10/1975 | Resz et al. |
| 4,585,694 | 4/1986 | Dehennau |
| 4,659,625 | 4/1987 | Decroly et al. ............. 428/412 |
| 4,680,207 | 7/1987 | Murray ..................... 525/240 |
| 4,774,146 | 9/1988 | Dehennau et al. .......... 428/518 |
| 4,959,269 | 9/1990 | Dehennau ................. 428/421 |

FOREIGN PATENT DOCUMENTS 0124931 11/1984 European Pat. Off.
0294141 12/1988 European Pat. Off.

OTHER PUBLICATIONS

Patent Abstracts of Japan, vol. 8, No. 191 (M-322) Sep. 4th, 1984; & JP-A-59 81 121 (Touyou Seikan K.K.) Oct. 5, 1984.

Primary Examiner—John Kight, III
Assistant Examiner—Duc Truong
Attorney, Agent, or Firm—Spencer, Frank & Schneider

[57] ABSTRACT

Coextruded granules of coated vinyl acetate/ethylene copolymers consisting of vinyl acetate/ethylene copolymer coated by coextrusion with a polar thermoplastic polymer, such as, for example, poly-(methyl methacrylate) or an ethylene/vinyl acetate copolymer. They are advantageously produced by extrusion drying of a wet coagulate of vinyl acetate/ethylene copolymer to produce a dry, extruded rod, in-line coating of the dry, extruded rod by coextrusion thereof with a polar thermoplastic polymer to produce a coextruded rod, and granulating the coextruded rod. The coextruded granules are not tacky, can be stored without problem, and are useful as coextrusion adhesives.

11 Claims, No Drawings

GRANULES OF COATED VINYL ACETATE/ETHYLENE COPOLYMER, PROCESS FOR PRODUCING THEM AND THEIR USE AS ADHESIVES

BACKGROUND OF THE INVENTION

1. Field of the Invention

The present invention relates to granules of vinyl acetate/ethylene copolymer coated with a polar thermoplastic polymer, to a process for producing such granules and to the use of these granules as adhesives. Vinyl acetate/ethylene copolymer is understood to mean vinyl acetate/ethylene copolymers having a preponderant content of vinyl acetate.

2. Description of the Related Art

It is well known to combine, by coextrusion, within multilayer structures, bulk polymers such as, for example, polyvinyl chloride or polyolefins with so-called special-purpose polymers imparting special properties such as resistance to corrosion or to ultraviolet rays or alternatively impermeability to gases, odours and/or water vapour.

Vinyl acetate/ethylene copolymers as defined above constitute effective coextrusion adhesives, used alone or mixed with other adhesive polymers, to cause bulk polymers such as vinyl chloride polymers or polyolefins to adhere to special-purpose polymers such as vinylidene chloride copolymers, vinylidene fluoride polymers, vinyl alcohol/ethylene copolymers (EVOH copolymers), polyamides, polyethylene terephthalates ("PET"), and the like. The use of coextrusion adhesives based on vinyl acetate/ethylene copolymers is described in Patent Applications EP-A-0,124,931 of 17 Apr. 1984, EP-A-0,164,766 of 10 Apr. 1985, EP-A-0,259,899 of 30 Jun. 1987 and EP-A-0,323,672 of 27 Dec. 1988, all in the name of SOLVAY & Cie.

Vinyl acetate/ethylene copolymers, hereinafter designated by the term "VAE copolymers", nevertheless possess the well-known drawback of being highly tacky and of usually taking the form of an agglomerated mass, making their use arduous. To remedy this drawback, it has already been recommended to coat vinyl acetate/ethylene copolymers by means of a hard thermoplastic polymer such as, for example, polyvinyl chloride (see, for example, Patent BE-A-697,025 of 14th Apr. 1967 in the name of SOLVAY & Cie). According to this document, the coating is carried out by coagulation of a latex of a hard polymer, such as polyvinyl chloride, on a coagulated latex of VAE copolymer. The coated VAE copolymer, isolated by draining followed by drying, takes the form of a dry powder of poor flowability. In addition, in the case where the coextrusion adhesive consists of a mixture of VAE copolymer with another adhesive polymer, its preparation will also involve a subsequent operation of mixing and of granulation of the mixture of adhesive polymers.

The objective of the present invention is to provide vinyl acetate/ethylene copolymers coated with a thermoplastic polymer which are usable as coextrusion adhesives not possessing the abovementioned drawbacks.

SUMMARY OF THE INVENTION

To this end, the invention provides coextruded granules consisting of vinyl acetate/ethylene copolymer coated by coextrusion by means of a polar thermoplastic polymer. The coextruded granules of the invention possess excellent flowability and can be stored without any problem, and they enable the hoppers of extruders to be fed readily and are usable as coextrusion adhesives without further processing.

The invention also provides a process for the manufacture of the said coextruded granules. According to this process, a coextruded rod is produced by extrusion drying of a wet coagulate of vinyl acetate/ethylene copolymer and in-line coating by coextrusion with a polar thermoplastic polymer, the said rod then being subjected to a granulation. The process of manufacture of coextruded granules according to the invention is of great simplicity in that it does not necessitate intermediate drying of the coagulate of VAE copolymer, and in that it enables granules based on vinyl acetate/ethylene copolymers which are usable as coextrusion adhesives without further processing to be obtained in a single step.

The use of the coextruded granules according to the invention as coextrusion adhesives constitutes another subject of the present invention.

DESCRIPTION OF THE PREFERRED EMBODIMENTS

Vinyl acetate/ethylene copolymer is understood to denote vinyl acetate/ethylene copolymers containing at least 55% by weight of vinyl acetate. Preferably, the vinyl acetate/ethylene copolymers participating in the composition of the coextruded granules according to the invention contain from 60 to 99% by weight of vinyl acetate, and still more especially from 70 to 95% by weight of vinyl acetate.

Preference is, moreover, given to relatively viscous VAE copolymers. Preferred VAE copolymers possess a melt index, measured at 170° C. under a load of 5 kg, of between 0.1 and 10 g/min, and more especially between 0.25 and 5 g/min.

Polar thermoplastic polymer is understood to denote thermoplastic polymers possessing a permanent dipole moment or, in other words, thermoplastic polymers which contain polar groups in their molecule. As nonlimiting examples of such polar thermoplastic polymers, which are usable alone or mixed, there may be mentioned halogenated polymers such as polymers (homo- and copolymeric) of vinyl chloride and those of vinylidene fluoride, polymers containing nitrile functions such as polyacrylonitrile and acrylonitrile/styrene copolymers, polyketones, polyesters, both aliphatic and aromatic, such as lower alkyl (C1 to C3) polyacrylates and polymethacrylates and polyethylene terephthalate, vinyl alcohol/ethylene copolymers (that is to say vinyl acetate/ethylene copolymers in which at least 90% of the acetate groups have been converted by hydrolysis or alcoholysis to hydroxyl groups), aromatic polycarbonates, and polyamides or nylons, all of which, moreover, constitute well-known polymers.

Preference is given to polar thermoplastic polymers which make it possible to combine the function of a coating polymer (avoiding sticking of the VAE copolymer) and, where appropriate, that of a supplementary adhesive polymer and/or one enhancing compatibility (improving the performance of the VAE copolymer).

Polar thermoplastic polymers to which preference is given are chosen from homo-and copolymeric methyl and ethyl polyacrylates and polymethacrylates, and ethylene/vinyl acetate copolymers having a preponderant content of ethylene ("EVA copolymers"), and mixtures thereof. Specially preferred polar thermoplastic polymers according to the present invention are chosen from poly(methyl methacrylate) and ethylene/vinyl acetate copolymers containing from 60 to 95% by weight of ethylene, and still more especially from 75 to 95% by weight of ethylene, and mixtures thereof.

Most especially preferred polar thermoplastic polymers according to the present invention are hence chosen from poly(methyl methacrylate) and ethylene/vinyl acetate copolymers containing from 75 to 95% by weight of ethylene, and mixtures thereof.

The relative weight contents of vinyl acetate/ethylene copolymer and polar thermoplastic polymer in the coextruded granules according to the invention are not critical and can vary over a wide range. As a guide, the weight content of vinyl acetate/ethylene copolymer in the granules is generally between 40 and 99% by weight, and more especially between 45 and 95% by weight.

In the case where the coextruded granules are used as coextrusion adhesives and where the adhesive consists essentially of vinyl acetate/ethylene copolymer, the polar thermoplastic polymer essentially acting as a coating polymer, the content of vinyl acetate/ethylene copolymer in the coextruded granules will usually be between 80 and 99% by weight, and more especially between 85 and 95% by weight, the balance consisting essentially of polar thermoplastic polymer. In the case where the coextruded granules are used as coextrusion adhesives and where the adhesive consists essentially of a mixture of vinyl acetate/ethylene copolymer and polar thermoplastic polymer, the latter acting in this case as a coating polymer and a supplementary adhesive polymer, the content of vinyl acetate/ethylene copolymer in the granules will usually be between 40 and 90% by weight, and more especially between 50 and 75% by weight, the balance consisting essentially of polar thermoplastic polymer. It is understood that the incorporation of minor amounts of polar thermoplastic polymer in the vinyl acetate/ethylene copolymer before its coating by means of a polar thermoplastic polymer is not ruled out.

The size of the coextruded granules is not really critical. Nevertheless, with a view to avoiding any sticking of the granules during prolonged storage, it is recommended that the length/diameter ratio of the granules should be equal to at least 1. The length of the granules does not usually exceed 10 mm and is generally between 3 and 5 mm.

The process according to the invention for the manufacture of coextruded granules consists in producing a coextruded rod by extrusion drying of a wet coagulate of vinyl acetate/ethylene copolymer and in-line coating by coextrusion with a polar thermoplastic polymer as defined above, the said rod then being subjected to a granulation. Wet coagulate is understood to denote coagulates containing at most 95% by weight of dry matter. In effect, coagulates containing less than 5% by weight of water are tacky and difficult to extrude. The water content of the wet coagulates can, moreover, safely be as high as 55% by weight. Nevertheless, it is preferable to employ wet coagulates containing of the order of 50 to 90% by weight of solid matter. Such wet coagulates are advantageously obtained by coagulation, by any common coagulation technique, of aqueous emulsions ("latices") originating from the copolymerisation of an aqueous emulsion of vinyl acetate and ethylene, followed, where appropriate, by draining.

The extrusion drying of the wet coagulate is advantageously performed in a co-rotating twin-screw extruder equipped with one or more vents intended for the discharge of water vapour, at a temperature above 100° C. but below 160° C., and preferably lying between 120° and 150° C. The twin-screw extruder is connected to a coextrusion feed block in which the dry rod of vinyl acetate/ethylene copolymer is coated by coextrusion by means of a polar thermoplastic polymer melted in a single-screw extruder. Adjustment of the ratio of the outputs of vinyl acetate/ethylene copolymer and of polar thermoplastic polymer enables the weight content of vinyl acetate/ethylene copolymer and of polar thermoplastic polymer in the coextruded granules to be adjusted. The range of temperatures used on the single-screw extruder will naturally be dependent on the nature of the polar thermoplastic polymer used. As a guide, in the case where the coating polymer consists of polymethacrylate, the temperature of single-screw extrusion will generally lie in the region of 200° to 220° C.; in the case of ethylene/vinyl acetate copolymers, in the region of 140° to 180° C.

The coextruded granules according to the invention are not tacky and can be stored without problem. They can be added to any polymer for the purpose of modifying its physical and/or mechanical properties. They can be used, in particular, as coextrusion adhesives. They are suitable, in particular, for producing coextruded multilayer complexes based on bulk polymers, such as, for example, vinyl chloride polymers and polyolefins, and so-called "special-purpose" polymers such as, for example, vinylidene chloride copolymers (commonly referred to as "PVDC"), vinylidene fluoride polymers and copolymers or alternatively vinyl alcohol/ethylene copolymers (commonly referred to as "EVOH"). They are most especially well suited to the coextrusion of steam-sterilisable multilayer complexes.

The examples which follow are intended as illustrations of the invention.

In all the examples, a wet vinyl acetate/ethylene copolymer containing 45% by weight of water is dried by extrusion on a co-rotating twin-screw extruder connected to a coextrusion feed block in which the dried, extruded rod of VAE copolymer is in-line coextruded with a polar thermoplastic coating polymer.

In all the examples, a vinyl acetate/ethylene copolymer containing 87% by weight of vinyl acetate and possessing a melt index (MI), measured at 170° C. under a load of 5 kg, equal to 1.4 g/min was used.

In Examples 1 to 4, the polar thermoplastic polymer consists of an ethylene/vinyl acetate copolymer containing 81% by weight of ethylene ("EVA copolymer"). In Examples 5 and 6, the relevant polymer is poly(methyl methacrylate) ("PMMA"), and in Examples 7 and 8 a mixture of EVA copolymer as used in Examples 1 to 4 and PMMA as used in Examples 5 and 6.

The wet VAE copolymer is dried by extrusion in a co-rotating extruder equipped with two intermeshed screws (length/diameter ratio equal to 42), the barrel of which is equipped with two gas discharge vents maintained under atmospheric pressure and located at a distance from the point of feed corresponding, respectively, to 13 and 21 times the diameter. A final gas discharge vent, connected to a vacuum pump, is located at a distance from the point of feed equal to 33 times the diameter. The barrel temperature is fixed at 150° C. and the speed of rotation of the screws at 100 rpm. The extruded rod of dry VAE copolymer then feeds a coextrusion feed block enabling a coextruded rod approximately 2.5 mm in diameter to be manufactured. The said feed block is equipped with a single-screw extruder 30 mm in diameter, possessing a length/diameter ratio equal to 20 and operating at a compression ratio of 2.5, in which the thermoplastic coating polymer is melted and homogenised.

General coextrusion conditions, and especially the speed of rotation of the single screw, the temperatures in the different regions of the barrel of the single-screw extruder, the setpoint temperatures of the feed block, the total coextrusion output and lastly the weight composition of the coextruded granules are recorded in the attached table.

The coextruded rods are then subjected to a granulation to produce coextruded granules approximately 3 mm in length. These granules exhibit no problem of sticking, even after long periods of storage.

They are usable as coextrusion adhesives for the production of multilayer complexes based on bulk polymers and so-called special-purpose polymers which withstand steam sterilisation.

TABLE

| Example No. | Single-screw speed, rpm | Barrel temp., °C | | | | Setpoint block temp., °C | Total output, kg/h | Content of VAE copolymer, % by wt. |
|---|---|---|---|---|---|---|---|---|
| 1 | 5 | 120 | 140 | 150 | 150 | 150 | 3.18 | 85 |
| 2 | 10 | " | " | " | " | " | 3 | 78 |
| 3 | 15 | " | " | " | " | " | 2.85 | 67 |
| 4 | 4 | " | " | " | " | " | 2 | 88 |
| 5 | 3 | 170 | 190 | 220 | 220 | 220 | 2.4 | 87 |
| 6 | 4 | " | " | " | " | " | 2.4 | 82 |
| 7 | 4 | 170 | 180 | 200 | 200 | 200 | 2.4 | 85 |
| 8 | 7 | " | " | " | " | " | 2.8 | 58 |

What is claimed is:

1. Coextruded granules, consisting of:
   a vinyl acetate/ethylene copolymer containing at least 55% by weight of vinyl acetate; and
   a polar thermoplastic polymer coated on the vinyl acetate/ethylene copolymer by coextrusion.

2. Coextruded granules according to claim 1, wherein the vinyl acetate/ethylene copolymer contains from 60 to 99% by weight of vinyl acetate.

3. Coextruded granules according to claim 1, wherein the vinyl acetate/ethylene copolymer has a melt index, measured at 170° C. under a load of 5 kg, of between 0.1 and 10 g/min.

4. Coextruded granules according to claim 1, wherein the polar thermoplastic polymer is selected from the group consisting of homo-and copolymeric methyl and ethyl polyacrylates and polymethacrylates, and ethylene/vinyl acetate copolymers having a preponderant content of ethylene, and mixtures thereof.

5. Coextruded granules according to claim 4, wherein the polar thermoplastic polymer is selected from the group consisting of poly(methyl methacrylate) and ethylene/vinyl acetate copolymers containing from 75 to 95% by weight of ethylene, and mixtures thereof.

6. Coextruded granules according to claim 1, wherein the coextruded granules contain between 40 and 99% by weight of the vinyl acetate/ethylene copolymer.

7. A process for the manufacture of coextruded granules consisting of a vinyl acetate/ethylene copolymer containing at least 55% by weight of vinyl acetate and a polar thermoplastic polymer coated on the vinyl acetate/ethylene copolymer by coextrusion, the process comprising:
   (a) extrusion drying a wet coagulate of vinyl acetate/ethylene copolymer containing at least 55% by weight of vinyl acetate to produce a dry extruded rod of vinyl acetate/ethylene copolymer;
   (b) in-line coating of the dry, extruded rod of vinyl acetate/ethylene copolymer by coextrusion thereof with a polar thermoplastic polymer to produce a coextruded rod; and
   (c) granulating the coextruded rod to provide coextruded granules.

8. The process according to claim 7, wherein the wet coagulate of vinyl acetate/ethylene copolymer contains 50 to 90% by weight of solid matter.

9. The process according to claim 7, wherein the extrusion drying of the wet coagulate is performed in a co-rotating twin-screw extruder having at least one vent at a temperature of between 120° and 150° C.

10. The process according to claim 9, wherein the co-rotating twin-screw extruder is connected to a coextrusion feed block in which the dry, extruded rod of vinyl acetate/ethylene copolymer is in-line coated by coextrusion thereof with a polar thermoplastic polymer melted in a single-screw extruder.

11. The process of providing a coextrusion adhesive, comprising:
   providing coextruded granules consisting of a vinyl acetate/ethylene copolymer containing at least 55% by weight of vinyl acetate and a polar thermoplastic polymer coated on the vinyl acetate/ethylene copolymer by coextrusion.

* * * * *